United States Patent [19]

Siol et al.

[11] Patent Number: 4,889,894

[45] Date of Patent: Dec. 26, 1989

[54] COMPATIBLE POLYMER MIXTURES

[75] Inventors: Werner Siol, Darmstadt-Eberstadt; Ulrich Terbrack, Reinheim, both of Fed. Rep. of Germany

[73] Assignee: Rohm GmbH, Darmstadt, Fed. Rep. of Germany

[21] Appl. No.: 119,089

[22] Filed: Nov. 10, 1987

[30] Foreign Application Priority Data

Nov. 11, 1986 [DE] Fed. Rep. of Germany ....... 3638443
Sep. 17, 1987 [DE] Fed. Rep. of Germany ....... 3731248

[51] Int. Cl.$^4$ .................... C08L 33/06; C08L 25/04; C08F 277/00
[52] U.S. Cl. .................................. 525/227; 525/241; 525/297
[58] Field of Search ........................ 525/227, 241, 297

[56] References Cited

U.S. PATENT DOCUMENTS

| | | | |
|---|---|---|---|
| 2,941,977 | 6/1960 | Roche et al. | 525/227 |
| 3,297,794 | 1/1967 | Imai et al. | 525/227 |
| 3,307,963 | 3/1967 | Webber | 525/227 |
| 3,629,211 | 12/1971 | Nozaki et al. | 525/227 |

*Primary Examiner*—Lewis T. Jacobs
*Assistant Examiner*—Susan Berman
*Attorney, Agent, or Firm*—Oblon, Spivak, McClelland, Maier & Neustadt

[57] ABSTRACT

Compatible polymer mixtures which consist of two polymer components which are (A) 0.1–99.9% by weight of a polymer P1, which is composed by at least 30% by weight of monomers with Formula I,

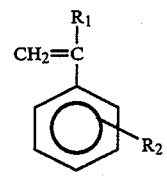

where $R_1$ stands for hydrogen or methyl and $R_2$ for a hydrocarbon group with 1–18 carbon atoms, and (B) 99–0.1% by weight of a polymer P2 which is composed of a monomer with Formula II by at least 30% by weight

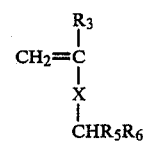

where $R_3$ stands for hydrogen, methyl or a group $-CH_2-X-CHR_5R_6$, X stands for a group

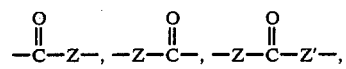

where Z is oxygen or $-NR_4$, Z' is oxygen or $-NR_4$, and $R_4$ is hydrogen or an alkyl gorup with 1–12 carbon atoms, $-CHR_5R_6$ stands for an aliphatic or araliphatic hydrocarbon group with 5–24 carbona atoms.

23 Claims, 4 Drawing Sheets

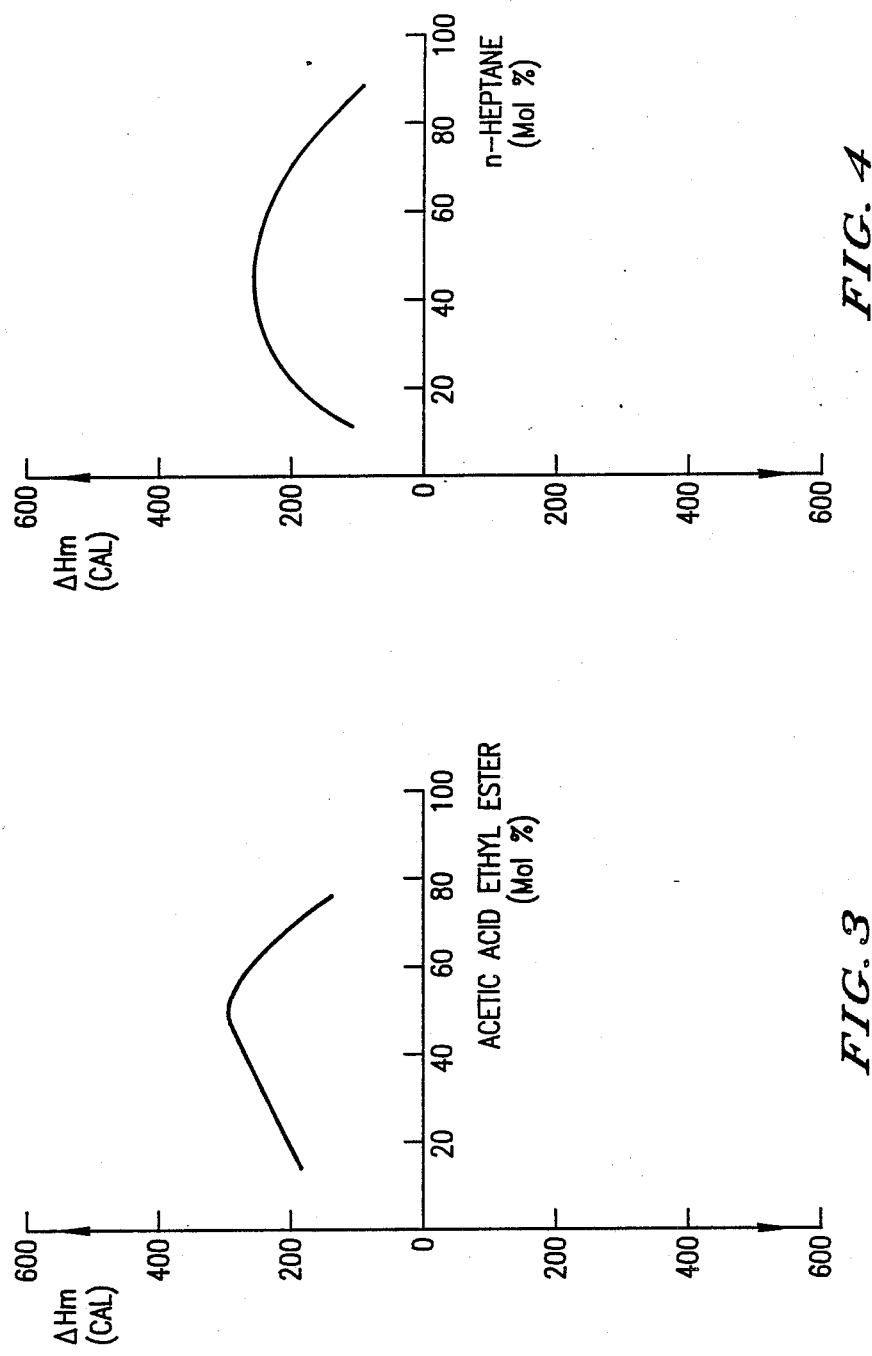

COMPATIBLE POLYMER MIXTURES

BACKGROUND OF THE INVENTION

1. Field of the Invention

The invention concerns compatible polymer mixtures (polymer blends) of an alkyl-substituted polystyrene as polymer component P1 and a polymer component P2 which contains carbonyl groups.

2. Discussion of the Background

As a rule, different polymer species are considered to be incompatible with one another, i.e. different polymer species generally do not form a homogeneous phase, which would be characterized by complete miscibility of the components, even down to slight amounts of a component.

Certain exceptions from this rule have caused increasing interest, particularly among the experts concerned with the theoretical interpretation of the phenomena. Completely compatible mixtures of polymers demonstrate complete solubility (miscibility) in all mixture ratios.

A summary representation of miscible polymer systems can be found, for example, in D. R. Paul et al. in Polymer & Engineering Science 18 (16) 1225–34 (1978); J. Macromol. Sci.-Rev. Macromol. Chem. C. 18 (1) 109–168 (1980) as well as in Annu. Rev. Mater. Sci., 1981, 299–319.

As evidence of the miscibility, the glass temperature Tg or the so-called "optical method" (clarity of a film poured from a homogeneous solution of the polymer mixture) is often used as a reference. (See Brandrup-Immergut, Polymer Handbook, 2nd edition, III, 211–213.) As a further test for the miscibility of polymers which are different from one another, the occurrence of the lower critical solution temperature (LCST) is used. (See German Pat. No. 34 36 476.5 and German Pat. No. 34 36 477.3). The occurrence of the LCST is based on the process which occurs during warming, where the polymer mixture, which has been clear and homogeneous until then, separates into phases and becomes optically cloudy to opaque. This behavior is a clear indication, according to the literature, that the original polymer mixture has consisted of a single homogeneous phase which was in equilibrium. For a further characterization of blends see also the contribution by M. T. Shaw: "Microscopy and Other Methods of Studying Blends" in *Polymer Blends and Mixtures* edited by D. J. Walsh, J. S. Higgins and A. Maconachie, NATO ASI Series, Series E: Applied Sciences-No. 89, p. 37–56, Martinus Nijhoff Publishers, Dordrecht/Boston/Lancester 1985. Examples of existing miscibility are represented, for example, by the systems polyvinylidene fluoride with polymethyl methacrylate (PMMA) or with polyethyl methacrylate. (U.S. Pat. No. 3,253,060, U.S. Pat. No. 3,458,391, U.S. Pat. No. 3,459,843). Recent results concerning "polymer blends" and possible applications for them are reported by L. M. Robeson in Polym. Engineering & Science 24 (8) 587–597 (1984).

Copolymers of styrene and maleic acid anhydride, as well as of styrene and acrylonitrile are compatible with polymethyl methacrylate (PMMA) under certain conditions (German Pat. No. 20 24 940). The improved usage properties of molding masses of these types was emphasized. In the same way, copolymers of styrene and monomers which contain hydroxyl groups which can form hydrogen bonds with a certain composition are also compatible with polymethacrylates, for example copolymers of styrene and p-(2-hydroxylhexafluoroisopropyl) styrene (B. Y. Min and Eli M. Pearce, Organic Coating and Plastics Chemistry, 45, (1981) 58–64), or copolymers of styrene and allyl alcohol (F. Cangelosi and M. T. Shaw, Polymer Preprints (Am. Chem. Soc. Div. Polym. Chem.) 24, (1983), 258–259). Polystyrene itself as well as other polymers which contain styrene are considered to be incompatible with polymethyl methacrylate. For example, M. T. Shaw and R. H. Somani indicate a miscibility with polystyrene of only 3.4 ppm (PMMA with a molecular weight of 160,000) or 7.5 ppm (PMMA with a molecular weight of 75,000). See Adv. Chem. Ser. 1984, 206; Polym. Blends Compos. Multiphase Syst., 33–42, (CA 101:73 417e). Even polystyrene with a very low molecular weight has little compatibility with PMMA. For example, a mixture of 20% of a styrene oligomer with an extremely low molecular weight (MW: 3,100) still does not yield a clear product. At a molecular weight of 9,600, which is also still very low, even a solution of only 5% in PMMA is just translucent. (Raymond R. Parent and Edward V. Tompson, Journal of Polymer Science: Polymer Physics Edition, Vol. 16, 1829–1947 (1978)).

Other polymethacrylates and polyacrylates demonstrate just as little miscibility with polystyrene to form transparent plastics. This is true, e.g., for polyethyl methacrylate, polybutyl methacrylate, polyisobutyl methacrylate, polyneopentyl methacrylate, polyhexyl methacrylate and many others. See also R. H. Somani and M. T. Shaw, Macromolecules 14, 1549–1554 (1981).

An exception to this generally observed incompatibility between poly(meth)acrylate and polystyrene is reported in two recent patent applications (P 36 32 370.5 and P 36 32 369.1). According to this, polystyrene and poly-α-methyl styrene are extremely compatible with polycyclohexyl methacrylate and polycyclohexyl acrylate. The compatibility of polycyclohexyl (meth)acrylate with polystyrene and poly-α-methyl styrene is so good that compatibility between the polymer which contains styrene and the polymer which contains cyclohexyl (meth)acrylate still exists if the cyclohexyl (meth)acrylate is contained at less than 50% by weight (for example, 30% by weight) in the copolymer. In the same way, the styrene can be extensively replaced by other comonomers, without the compatibility between the polymer which contains styrene and the polymer which contains cyclohexyl (meth)acrylate being lost.

Aside from this extraordinary, complete miscibility of cyclohexyl (meth)acrylate with polystyrene and poly-α-methyl styrene, miscibility of polystyrene is only reported with polyvinyl methyl ether, polyphenylene oxide and tetramethyl bisphenol-A-polycarbonate (D. R. Paul and J. W. Barlow, J. Macromol. Sci.-Rev. Macromol. Chem., C 18 (1), 109–168 (1980)). The miscibility is generally explained by specific interactions between the different polymer species. The compatible polymer mixtures mentioned above (e.g. tetramethyl bisphenol-A-polycarbonate/polystyrene) are explained by electron donator-acceptor complex formation, for example. (See J. W. Barlow and D. R. Paul, Annu. Rev. Mater. Sci., 1981 299–319).

The majority of the compatible polymer mixtures known until now, however, are attributed to special interactions of the hydrogen bond formation type (for example, phenoxy/polyester, PVC/polyester, SAA/- polyester, PC/PHFA, PVDF/PMMA. See J. W. Barlow and D. R. Paul, Annu. Rev. Mater. Sci., 1981, 303, 304).

The compatible polymer mixtures mentioned above are attributed to hydrogen bond formation or to electron donator-acceptor complex formation. The compatibility of PMMA with special copolymers of styrene and acrylonitrile or α-methyl styrene and acrylonitrile, which is found only at a certain styrene/acrylonitrile or α-methyl styrene/acrylonitrile ratio in each case, is explained by an intramolecular repulsion within the copolymer between the two comonomers styrene and acrylonitrile. This also makes it understandable that compatibility (for example between PMMA and SAN) is found only for a very specific composition of the copolymer. Since compatibility is only found for very specific comonomer ratios, this is termed "miscibility windows" (J. -L. G. Pfenning et al., Macromolecules 1985, 18, 1937–1940). Such "miscibility windows" are also reported for compatible mixtures of aliphatic polyesters and polyhydroxy ethers of bisphenol A. Here, the aliphatic polyesters are viewed as copolymers of $CH_x$— and COO-monomer modules. (D. R. Paul and J. W. Barlow, Polymer, 25, 487 (1984)). Paul and Barlow were able to show with this study that an exothermic miscibility can exist as a driving force for miscibility even if none of the interaction parameters are negative. The only requirement is sufficiently great repulsion energy between the comonomers of the copolymer.

Gerrit ten Brinke et al. also explain the miscibility of halogen-substituted styrene copolymers with poly-(2,6-dimethyl-1,4-phenylene oxide) (Macromolecules 1983, 16, 1827–32) with precisely this concept, and Ougizawa and Inoue, Polym. J., 18, 521–527 (1986) use it to explain the miscibility of poly(acrylonitrile co-styrene) with poly(acrylonitrile co-butadiene).

While on the one hand, the compatibility of specific copolymers with other polymers is therefore explained by intramolecular repulsion within the copolymers, thereby also explaining the "miscibility windows," specific interactions are always referred to for an interpretation of the compatibility of homopolymers (e.g. EDA complexes in the case of polyphenylene oxide/polystyrene or hydrogen bond formation in the system PVDF/PMMA). There is no overall theory to explain miscibility in a polymer, which can be used to find new compatible polymer mixtures. Such compatible polymer mixtures are sought for many applications, however.

Mechanical mixtures of polymers (polyblends) have resulted in plastic products with improved properties in certain cases and in certain areas of the plastics industry (See Kirk-Othmer 3rd edition, Vol. 18, pp. 443–478, J. Wiley 1982). The physical properties of such "polyblends" generally represent a compromise, which can mean an overall improvement as compared with the properties of the individual polymers. In these situations, multi-phase polymer mixtures have achieved much greater commercial significance than compatible mixtures (See Kirk-Othmer, loc. cit., p. 449.)

Multi-phase and compatible mixtures must therefore be kept strictly separate with regard to both their physical properties and their properties which are relevant for application technology, especially their optical properties (transparency, clarity, etc.). As already explained, a lack of compatibility often sets narrow limits for mixing plastics with the goal of thereby achieving an improved overall spectrum of properties. However, the state of the art does not offer any teaching to assist in finding the compatible polymer mixtures demanded by technology.

SUMMARY OF THE INVENTION

Accordingly, one object of the present invention is to provide compatible polymer mixtures which are compatible in all proportions and at all useful temperatures.

Another object of the invention is to provide compatible polymer mixtures which exhibit de-mixing upon heating.

Still a further object of the invention is to provide compatible polymer mixtures with reduced water absorption, double refraction, refractive index and improved processing properties.

These and other objects which will become apparent from the following specification have been achieved by the compatible polymer mixtures of the present invention comprising:

(A) 0.1–99.9% by weight of a polymer P1, which is composed by at least 30% by weight of monomers with Formula I,

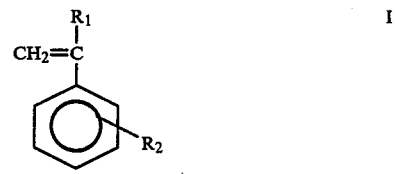

where $R_1$ stands for hydrogen or methyl and $R_2$ for a hydrocarbon group with 1–18 carbon atoms, and (B) 99–0.1% by weight of a polymer P2 which is composed of a monomer with Formula II by at least 30% by weight

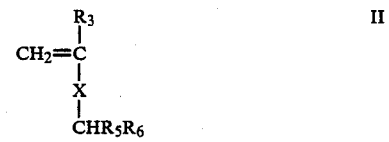

where $R_3$ stands for hydrogen, methyl or a group $-CH_2-X-CHR_5R_6$, X stands for a group

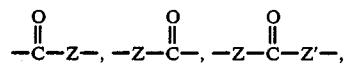

where Z is oxygen or $-NR_4$, Z' is oxygen or $-NR_4$, and $R_4$ is hydrogen or an alkyl group with 1–12 carbon atoms, $-CHR_5R_6$ stands for an aliphatic or araliphatic hydrocarbon group with 5–24 carbon atoms.

BRIEF DESCRIPTION OF THE DRAWINGS

A more complete appreciation of the invention and many of the attended advantages thereof will be readily obtained as the same becomes better understood by reference to the following detailed description when considered in connection with the accompanying drawings, wherein:

FIG. 3 illustrates the heat of mixing of decalin and acetic acid ester;

FIG. 4 illustrates the heat of mixing of 3-pentanone and n-heptane;

DETAILED DESCRIPTION OF THE PREFERRED EMBODIMENTS

It is particularly unsatisfactory that the interpretation of the polymer mixtures known until now, i.e. in particular the type of assumed specific interactions, such as the assumption of hydrogen bonds between PVDF and PMMA, in other words hydrogen bonds proceeding from the —$CH_2$—$CF_2$-group of the PVDF to the ester group of the PMMA is in contradiction to any experience. The same is true for the hydrogen bonds between PVC and PMMA which are cited so frequently. The present invention makes use of the realization that such assumptions (such as hydrogen bonds between PVDF and PMMA or between PVC and PMMA), which contradict experience, are not at all necessary for an understanding of the miscibility of these polymers. Rather, it has been found that the concept of repulsion between the comonomer modules (e.g. repulsion between styrene and acrylonitrile in SAN) can be transferred to homopolymers and that rules for technical action can be derived from it.

The new theory for an understanding of polymer mixtures therefore provides miscibility between different types of polymers P1 and P2 if:

(1) polymer P1 is composed of monomer modules with at least two subunits which can be chemically differentiated, which repulse each other, and (2) polymer P2 also consists of monomer modules which in turn are composed of at least two subunits which can be chemically differentiated, which also repulse each other, and (3) a negative or only slightly positive enthalpy of mixing for the mixture of the hydrogenated monomer modules of polymer 1 with polymer 2 is measured.

Figures 1, 2:
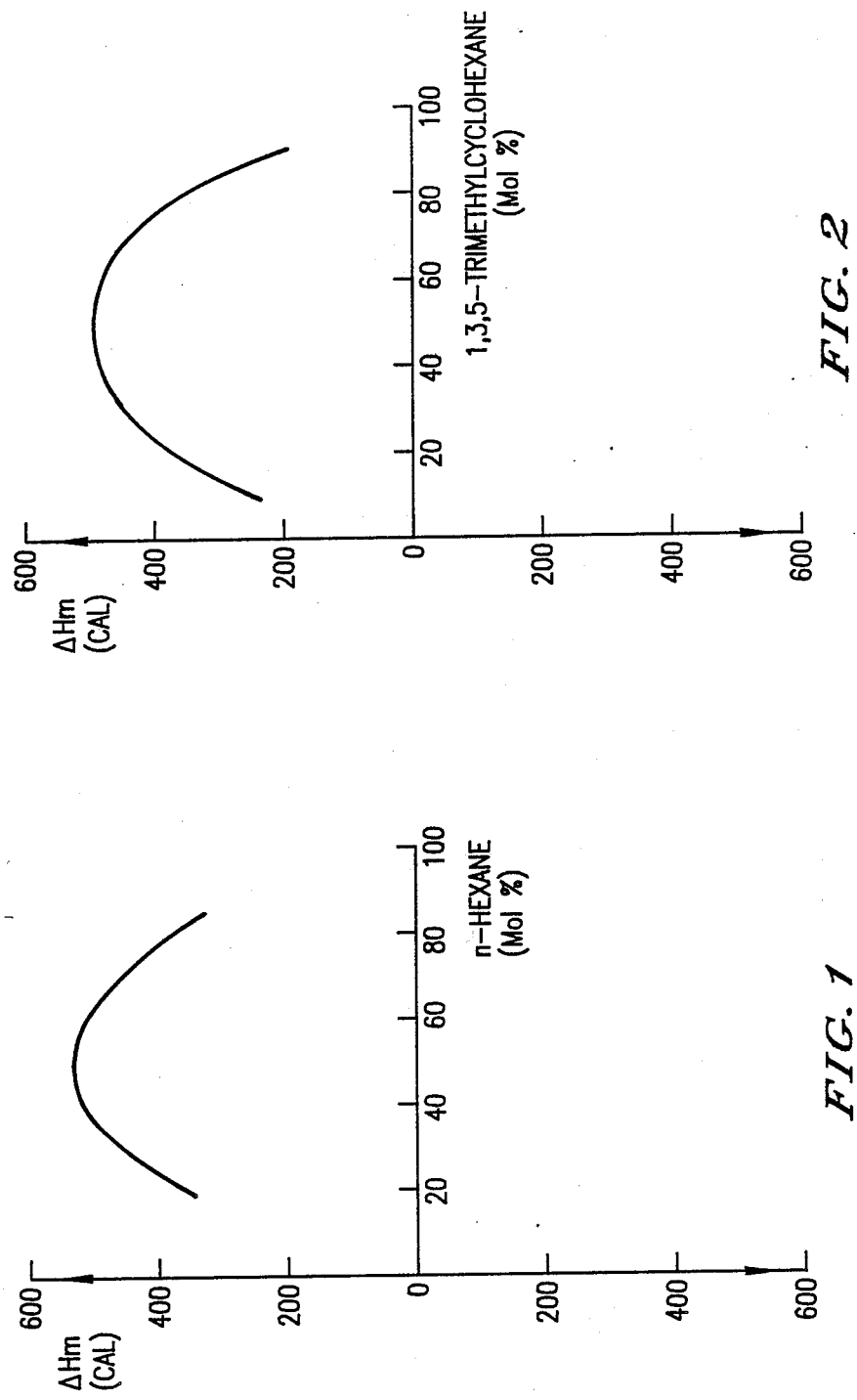
FIG. 1 illustrates the heat of mixing of perfluoro-n-hexane and n-hexane.
FIG. 2 illustrates the heat of mixing of perfluorocyclohexane and 1,3,5-trimethylcyclohexane.

The new theory explains the miscibility between polymers which contain halogens, on the one hand, and polymers which contain carbonyl groups, on the other hand, without difficulty, which will be demonstrated in the following. The data required for this can be obtained from general tabular compilations, such as Landoldt-Bornstein, 5th and 6th edition, Berlin, Julius-Springer-Verlag. FIG. 1 shows the heat of mixing of perfluorohexane and hexane. As is evident from FIG. 1, this mixture is strongly endothermic; $\Delta H_{mixture}$ for an equimolar mixture is +500 cal/mol of mixture. The corresponding mixture of perfluorocyclohexane and cyclohexane is just as strongly endothermic (see FIG. 2). As can be documented with further examples, mixtures of alkanes and perfluoroalkanes are generally endothermic. Therefore, in the case of PVDF, there are two subunits combined in one monomer module (the $CH_2$ and the $CF_2$ groups) which repulse each other.

In the same way, PMMA is also composed of two subunits which repulse each other, a hydrocarbon portion and an ester group.

Figure 5:
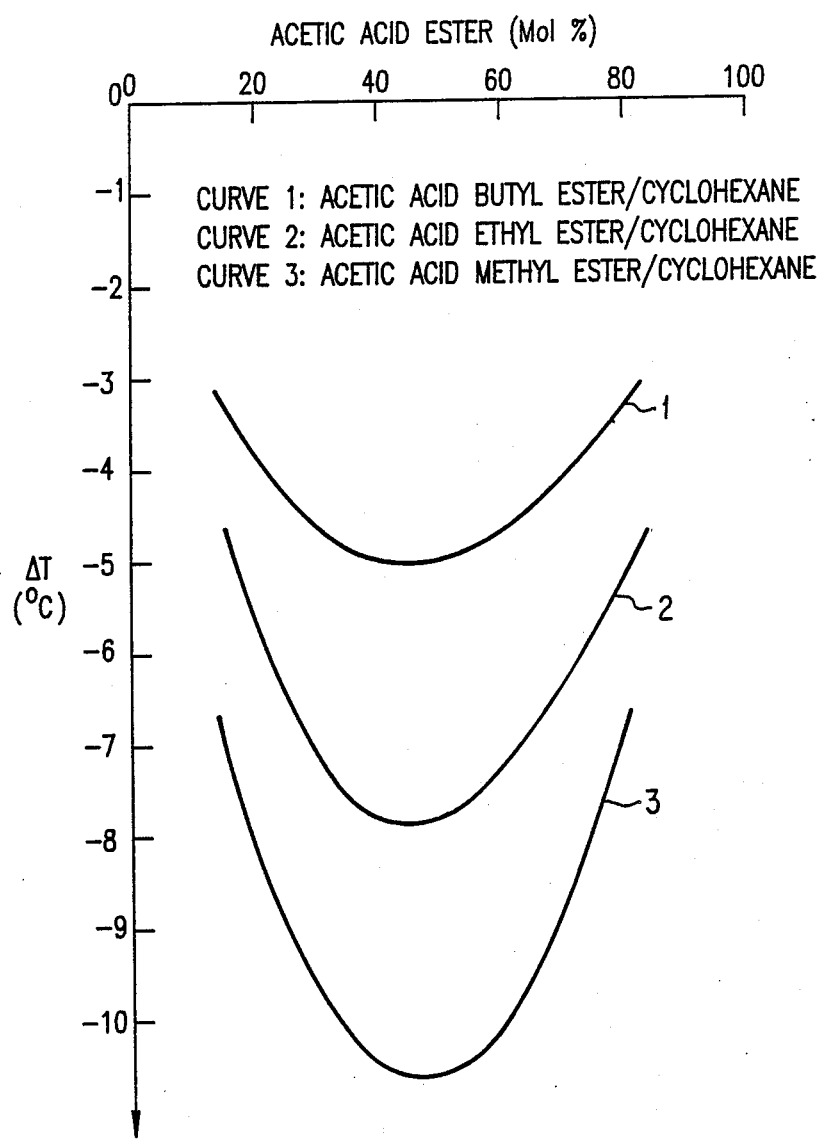
FIG. 5 illustrates the quantity of heat developed when mixing acetic acid ester with cyclohexane.
Figure 6:
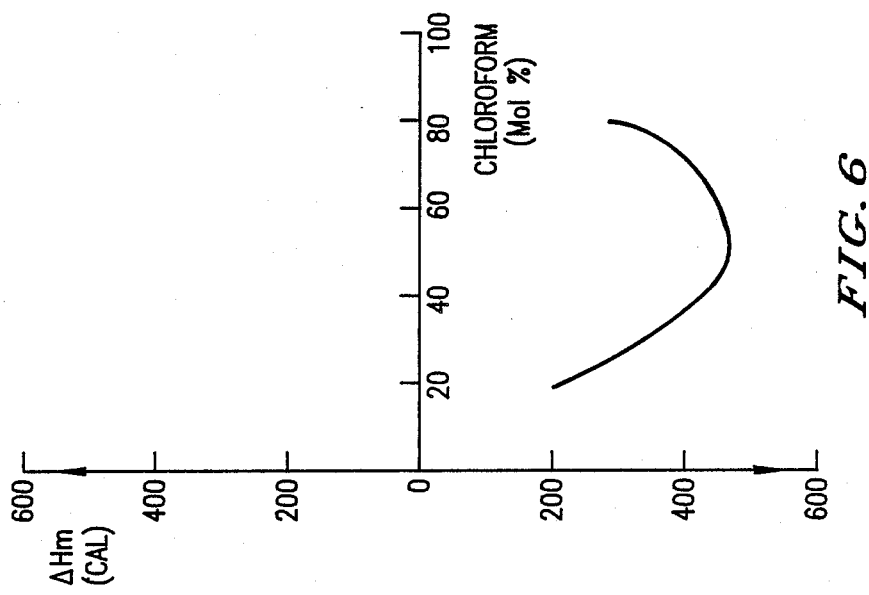
FIG. 6 illustrates the heat of mixing of acetone and chloroform.

FIG. 3 shows the heat of mixing of acetic acid ethyl ester and decaline (288 cal/mol of mixture), FIG. 4 shows the heat of mixing of pentanone (3) and n-heptane. Here again, a distinct repulsion between the carbonyl groups and alkane can be seen. In FIG. 5, the repulsion between the aliphate (cyclohexane) and carbonyl group is represented as a temperature change during mixing. As can be seen, the repulsion increases with an increasing content of carbonyl groups in the ester. Correspondingly, clearly distinct cooling occurs during mixing. According to this, the compatibility of PVDF and PMMA can be understood as a direct consequence of the repulsion between the $CH_2$ and $CF_2$ subunits of the PVDF as well as the repulsion between the aliphatic part and the ester group of the PMMA. The compatibility of PVC with PMMA can be interpreted in a completely analogous way. For example, the mixture of chloroform and cyclohexane is endothermic (165 cal/mol of mixture for a 1:1 mixture). In contrast, the mixture 1,1,2,2-tetrachloroethane/acetic acid ethyl ester which corresponds to the polymer mixture PVC/PMMA is strongly exothermic (-608 cal/mol of mixture for a 1:1 mixture). The mixture of chloroform/acetone, which is shown in FIG. 6, is also exothermic. The new way of interpreting the miscibility of PVDF/PMMA and hydrocarbons which contain chlorine and PMMA is a direct consequence of the suprising discovery of a whole class of compatible polymers, which could not have been explained, not to mention predicted, with the rules and criteria of the prior art. The new class of polymers according to the invention involves a mixture of two polymer species whose compatibility cannot be explained either by hydrogen bonds or by EDA complex formation.

It was now found that surprisingly, polymer mixtures PM of two different polymers P1 and P2 demonstrate good compatibility if polymer 1 (P1) is composed of monomers with Formula I or contains these monomers as a major component

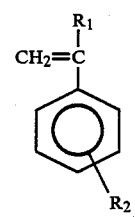

I where $R_1$ stands for hydrogen or methyl and $R_2$ stands for a hydrocarbon group with 1–18, preferably 1–12 carbon atoms and polymer P2 is composed of monomers with Formula II or contains these as a major component

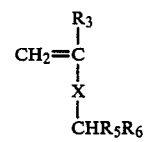

II where $R_3$ stands for hydrogen, methyl or a group —$CH_2$—X—$CHR_5R_6$, X stands for a group

where Z is O or $NR_4$, Z' is O or $NR_4$ and $R_4$ is hydrogen or an alkyl group with 1-12, preferably 1-5 carbon atoms, —$CHR_5R_6$ stands for an aliphatic or araliphatic hydrocarbon group with 5-24 carbon atoms, with $R_5$ and $R_6$ either being connected in a ring, to form an optionally substituted ring with 5-12 carbon atoms, or $R_5$ stands for hydrogen and an aliphatic hydrocarbon group and $R_6$ stands for an optionally substituted aliphatic, araliphatic or aromatic hydrocarbon group, with 4-18 carbon atoms. Preferably, $R_2$ also stands for an aliphatic hydrocarbon group. The optionally substituted groups involve inert substituents, for example n-alkyl, iso-alkyl and tert. alkyl groups with 1-6 carbon atoms, e.g. methyl, ethyl, propyl, isopropyl, butyl, etc. The $R_2$ group may also be a —$CH_3R_7R_8$ group as discussed below.

Those polymer mixtures PM of polymers P1 and polymers P2 which fulfill the additional requirement that the Van der Waals volumes ($V_W$) of the

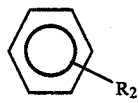

group satisfy the relation

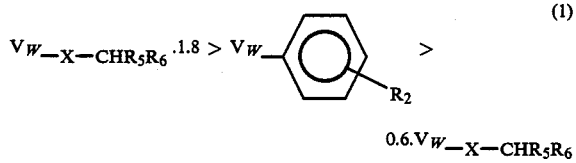

(1)

find particular interest. There $V_{W-X-CHR_5R_6}$ stands for the Van der Waals volume, expressed in $cm^3/mol$, of the —X—$CHR_5R_6$ group, and

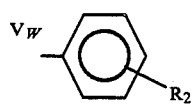

stands for the corresponding Van der Waals volume of the

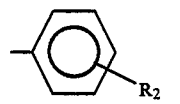

group. For a definition of the Van der Waals volumes, see A. Bondi, J. Phys. Chem. 68, 441 (1964); M. Charton in Topics in Current Chemistry, Vol. 114, Steric Effects in Drug Design, p. 107, Springer Verlag 1983. Those polymer mixtures PM which satisfy the requirement

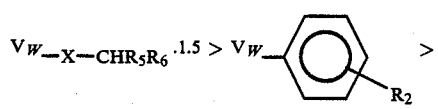

(2)

are particularly preferred.

Furthermore, those polymer mixtures PM which satisfy the requirement that the hydrogenated (saturated) monomer modules of the polymer P1

$$H1 \quad CH_3-\underset{\underset{R_2}{|}}{\overset{\overset{R_1}{|}}{C}}-H \text{ (phenyl)}$$

and the hydrogenated monomer modules of the polymer P2

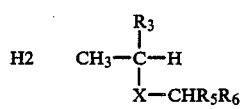

demonstrate at most a slightly positive enthalpy of mixing (i.e. $\Delta$ H mixture H1/H2 < 50 cal/mol of mixture, or preferably a negative enthalpy of mixing, so that the following applies: $\Delta$ H mixture H1/H2 < 0 cal/mol of mixture.

As a rule, this exothermic mixing of the hydrogenated monomer modules and thereby also the miscibility of the polymers P1 and P2 is caused by repulsion within the monomer modules of the polymer P1 and within the monomer modules of the polymer P2, as this was shown initially using the examples of PVDF/PMMA and PVC/PMMA.

Here, the repulsion within the monomer module of the polymer P2 is based on the repulsion, as explained above, between the polar X group and the aliphatic —$CH_2$—$CR_3$ group as well as the —$CHR_5R_6$ group. See FIG. 3 for an example of these repulsion forces.

Figure 7:
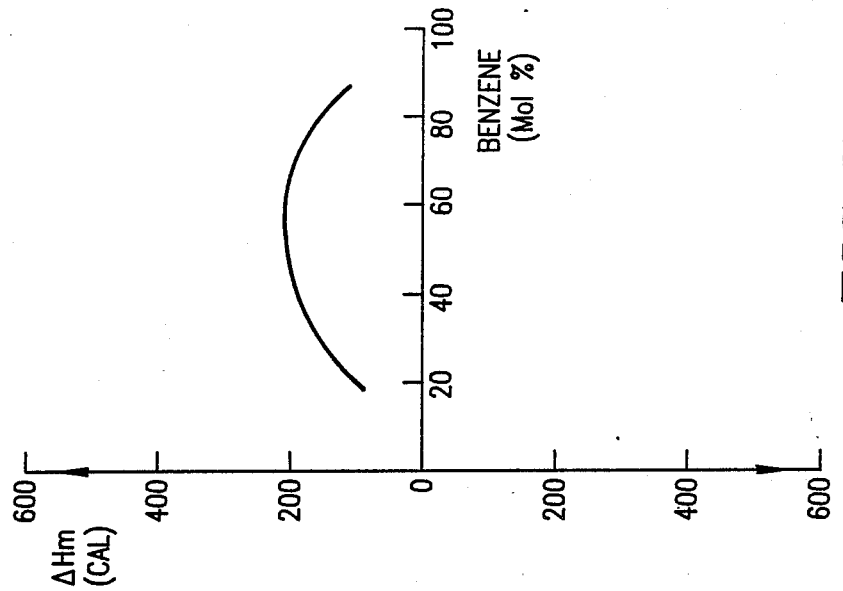
FIG. 7 illustrates the heat of mixing of n-hexane and benzene.

In contrast, the repulsion within the monomer module of the polymer P1 is based on the repulsion between aliphatic and aromatic hydrocarbons. FIG. 7 shows the heat of mixing of n-hexane and benzene as an example. Here, the general rule applies that compatibility of polymer P1 and polymer P2 exists particularly if the repulsion forces within the monomer modules are especially great. Therefore, good miscibility between the polymer is particularly found if the aliphatic section found in the main chain, which is directly adjacent to the phenylene group in the monomer module of the polymer P1 and to the polar group X in the monomer module is as distinct as possible. This means that as a rule, better compatibility with the polymers P2 is found in polymers with $R_1$ is $CH_3$ than in polymers where $R_1$ is hydrogen. This is particularly true for a small $R_2$ group. $R_2$ is preferably $C_1$-$C_4$. Completely analogously, particularly good compatibility with the polymers P1 is also found within the group of polymers P2 if $R_3=CH_3$.

Furthermore, it is advantageous if the group —$CHR_5R_6$ forms a tightly packed compact hydrocarbon and as a rule, attention should be paid to having the group X—$CHR_5R_6$ adapted to the

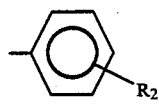

group in terms of its space requirement (i.e. comparable Van der Waals volumes of the groups present).

While a large number of substituents —CHR$_5$R$_6$ is possible for large substituents R$_2$ (e.g. R$_2 \geqq 4$ carbon atoms), as long as the —CHR$_5$R$_6$ group has only at least 5 carbon atoms, cycloaliphatic CH$_5$R$_6$ or phenyl alkyl group are preferred particularly in the case of a small R$_2$-group (e.g. R$_2$ is CH$_3$).

The R$_2$ group can be localized, in principle, in the o, m or p position at the phenyl group. However, the m or p position, and very particularly, the p position, is preferred.

The R$_3$ group represents, as explained above, either hydrogen, methyl or a group of the type —CH$_2$—X——CHR$_5$R$_6$. R$_3$ groups with R$_3$ is hydrogen or methyl are preferred. Within the —CH$_2$—X—CHR$_5$R$_6$ group, those with the structure

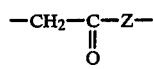

are preferred. The group X is of the type

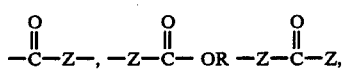

with the groups of the type

being preferred and the group

being particularly preferred.

In principle, —Z— can be oxygen or a —NR$_4$— group with R$_4$ is hydrogen or an alkyl group. In general, oxygen or a —NR$_4$— group with R$_5$ not hydrogen. However, —Z— groups in which —Z— is oxygen are very especially preferred.

It is preferred if the group —CHR$_5$R$_6$ is be adapted to the

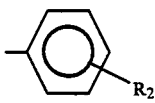

group in terms of the space it takes up (Van der Waals volume). —CHR$_5$R$_6$ groups in which R$_5$ and R$_6$ are closed into a cycloaliphatic ring find particular interest. Here, rings with 5-12 carbon atoms in the ring should be taken into consideration. Rings with 5-7 carbon atoms in the ring, and very especially cyclohexyl groups are preferred, and the ring can also be substituted in each case. Here again, the reciprocal adaptation mentioned above also applies: in case R$_1$ is hydrogen and R$_2$ does not contain any quarternary carbons the cycloalkyl group should not be doubly substituted at a ring carbon atom, i.e. in this case the CHR$_5$R$_6$ should not have any quarternary carbon, either. Vice versa, the CHR$_5$R$_6$ group can contain a quarternary carbon, particularly if the R$_2$ group contains a quarternary carbon. In this case, those CHR$_5$R$_6$ groups in which at least 1 carbon atom of the CHR$_5$R$_6$ group—generally 1 carbon atom of the R$_6$-group—is substituted with at most 1 hydrogen atom. As a rule, R$_5$ is hydrogen or forms a ring with R$_6$. Beyond this, however, R$_5$ can also represent an alkyl group with 1-5 carbon atoms.

If we consider the monomer of Formula I which essentially comprises the polymer P1, all alkyl-substituted styrenes and/or $\alpha$-methyl styrenes come into consideration, as a rule, with those R$_2$ groups in which R$_2$ stands for a CCH$_3$R$_7$R$_8$ group, with R$_7$ standing for hydrogen or an alkyl group with 1-8 carbon atoms and R$_8$ standing for an alkyl group with 1-8 carbon atoms being particularly mentioned.

Those R$_2$ groups in which R$_7$ and R$_8$ stand for methyl are especially preferred. In addition, R$_2$ can also be methyl, ethyl or n-propyl.

The content of monomers of Formula I in the polymers P1 depends on the extent of required compatibility and is at least 30% by weight, generally 60% by weight, preferably at least 80% by weight. Those polymers P1 with a content of at least 95% by weight of monomers with Formula I are especially preferred. For the case that R$_1$ is H, homopolymers P1 from the monomers of Formula I are the very especially preferred embodiment.

As comonomers for the composition of the polymer P1 in which copolymers are present, vinyl monomers (different from Formula I) are particularly preferred. (See Ullmann's Encyclopadie der Technischen Chemie, 3rd edition, 14th Volume, p. 108-109, Urban & Schwarzenberg 1963. Here, monomers which are composed only of carbon, hydrogen and oxygen are preferred. Especially, these are vinyl esters and/or (meth)acrylic acid esters, generally those with 4-22 carbon atoms in the molecule. In subordinate proportions, i.e. in proportions of less than 20% by weight, styrene or $\alpha$-methyl styrene can also be contained in the polymer.

While the polymer P1 can accordingly be modified with other hydrophobic vinyl compounds, the proportion of highly polar monomers, such as e.g. acrylamide, acrylonitrile, maleic acid anhydride, maleic acid imides, p-(2-hydroxyhexafluoroisopropyl) styrene or allyl alcohol is very limited. The proportion of these polar monomers should amount to less than 10% by weight or less than 5% by weight of the polymer P1. Such polymers A which contain less than 0.1% by weight of these polar monomers are especially preferred.

The content of monomers II in the polymers P2 is also guided by the extent of required compatibility and is also at least 30% by weight, generally 50% by weight, preferably at least 70% by weight, and in an especially preferred embodiment, >95% by weight. For many application purposes, the use of homopolymers of the monomers II to make up the polymers P2 is very particularly interesting.

As comonomers for the composition of the polymer P2, the monomers identified above for the polymer P1 also come into consideration, in addition to the monomers with Formula II, with the use of highly polar monomers being limited here, also (as a rule, polar monomers are limited to a content of <20% by weight, preferably <5% by weight).

For the monomers of Formula II, which basically comprise the polymer P2 (>50% by weight)—if not actually 100%—preferred are the vinyl esters, vinyl amides, vinyl carbonates, vinyl urethanes and vinyl ureas which can be derived from Formula II, as well as the corresponding propylene compounds. In addition, the monomers of Formula II stand for amides and esters of itaconic acid. Preferred monomers II, however, are esters and amides of acrylic acid and methacrylic acid. Very generally the esters are especially preferred. In case monomers with Formula II which contain nitrogen are used, those without an NH group are preferred. The following should be particularly mentioned as monomers of Formuls II: optionally substituted vinyl or propenyl esters of cycloalkane carboxylic acids and cycloalkyl carbonates, cyloalkyl acrylates, cycloalkyl methacrylates and cycloalkyl itaconates, optionally substituted vinyl esters or propenyl esters of phenylalkyl carboxylic acids and phenylalkyl carbonates, phenylalkyl acrylates, methacrylates and itaconates. Cyclohexyl acrylate and cyclohexyl methacrylate should be especially mentioned. However, it should always be noted that the monomers of Formula II of the polymer P1 and the monomers of Formula II of the polymer P2 cannot be seen in isolation.

Therefore, the repulsion of the subunits of the monomer module I and the space occupied (Van der Waals volume) by the subunits of the monomer module I must always be seen in relation to a repulsion of the subunits of the monomer module II and the space it occupies.

For example, poly-p-tert.-butyl styrene (as polymer P1) demonstrates a distinct, sterically demanding aliphatic portion (the t-butyl group) right next to the phenylene group. The distinct repulsion between the aliphatic and the aromatic part of this monomer unit which exists as a result makes poly-p-tert.-butyl styrene an ideal mixing partner for polymer P2, with the only restriction being that polymer P2 should also demonstrate a distinct repulsion within the monomer module, i.e. in addition to the X group, a large (best of all, even a branched) aliphatic group —CHR$_5$R$_6$.

Accordingly, poly-p-tert.-butyl styrene (polymer P1) is also compatible, without limitation, with the sterically demanding poly-3,3,5-trimethyl cyclohexyl acrylate (over the mixture range of 1:99 to 99:1 as indicated). In the polymer mixture PM, complete compatibility is found in the entire temperature range accessible experimentally (i.e. up to >250° C.).

As an example of the polymer mixture PM with unlimited compatibility according to the invention, the following are listed:

Polymer P1

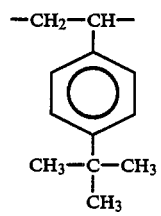

Polymer P2 with the units

-continued

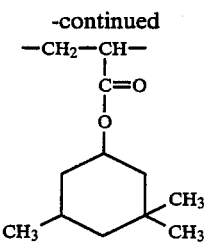

In the examples given below, the excellent compatibility of poly-p-tert-butyl styrene as the polymer P1 with the polymers P2 will be demonstrated, with poly-p-tert-butyl styrene as the model system for six further examples.

In contrast to poly-p-tert-butyl styrene as the polymer P1, poly-p-methyl styrene does not have any distinct aliphatic areas aside from the phenylene group, i.e. the repulsion of the group within the monomer module is significantly less. This also makes the range of variation within the polymer P2 less. Accordingly, poly-p-methyl styrene is completely incompatible with the poly-3,3,5-trimethyl cyclohexyl acrylate mentioned above. Complete compatibility, on the other hand, is found with polycyclohexyl acrylate as polymer P2. (Poly-p-methyl styrene and polycyclohexyl acrylate both have no quarternary carbon atoms in the alkyl group and are comparable in their geometry.)

Compared with this, poly-p-tert-butyl styrene, which demonstrates excellent compatibility with sterically demanding polymers P2, as polymer P1, demonstrates clearly lesser compatibility with the sterically less demanding polycyclohexyl acrylate which has a clearly lesser Van der Waals volume, as polymer P2. Although these polymers are still completely compatible at room temperature, de-mixing occurs when they are heated to approximately 80° C.

An example for a polymer mixture with unlimited compatibility according to the invention:

Polymer P1

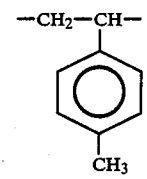

Polymer P2 with the units

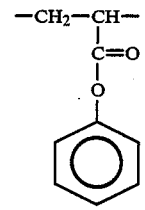

In addition to these polymer mixtures which are compatible over the entire temperature range and in all mixture ratios, those polymer mixtures PM which are only compatible in a limited temperature range (e.g. <100° C.) are also interesting.

As a rule, the mixture ratio of polymer P1 and polymer P2 can be varied within wide limits. Therefore, the polymer mixtures PM according to the invention generally consist of:

(A) 0.1–99.9% by weight of a polymer P1, which is composed by at least 30% by weight of monomers with the Formula I and (B) 99.1–0.1% by weight of a polymer P2, which is composed by at least 30% by weight of monomers with Formula II.

Those polymer mixtures which consist of 1–99% by weight of polymers P1 and 99–1% by weight of polymers P2 are primarily of interest. Those polymer mixtures which consist of 10–90% by weight of polymer P1 and 90–10% by weight of polymer P2 are especially interesting. Finally, those polymer mixtures which consist of 20–80% by weight of polymer P1 and 80–20% by weight of polymer P2 are very especially interesting. In each case, the composition of the polymer mixture PM is dependent on the technical requirements (see below).

It is also dependent on the technical requirements whether polymer P1 can also contain monomers of Formula II or polymer P2 can also contain monomers of Formula I. As a rule, it is true that the content of monomers of Formula I in the polymer P1 should be at least 30% by weight higher than the content of the monomers of Formula I in the polymer P2. Analogously, the content of monomers of Formula II in the polymer P2 should be at least 30% by weight higher than the content of monomers of Formula II in the polymer P1. Those polymer mixtures in which the content of monomers of Formula I in the polymer P2 is <10% by weight, very especially preferably 0% by weight, and the content of monomers of Formula II in the polymer P1 is also <10% by weight, very especially preferably 0% by weight, are especially preferred. In general, it holds true that the content of monomers of Formula I in the polymer P1 and the content of polymers of Formula II in the polymer P2 can be low, particularly if the other monomer modules in the polymer P1 and in the polymer P2 extensively agree in their chemistry.

The characterization of the polymer mixtures PM according to the invention as compatible mixtures takes place according to the recognized criteria (see Kirk-Othmer, loc. cit., Vol. 18, pp. 457–460).

(a) When using optical methods, a single index of refraction is observed in the polymer mixtures PM according to the invention, which lies between those of the two polymer components P1 and P2.

(b) The polymer mixtures PM possess a single glass transition temperature Tg which lies between that of the polymer components.

For further characterization of the polymer mixtures PM according to the invention, see the contribution by M. T. Shaw in "Polymer Blends and Mixtures" mentioned above.

PRODUCTION OF POLYMERS P1 AND P2

Production of the polymers P1 and P2 can take place according to the known rules of polymerization and according to known methods. The polymers of type P1 can be produced, for example, according to Houben-Weyl, Methoden der Organischen Chemie, 4th edition, Volume XIV/1, pp. 761–841, Georg Thieme Verlag (1961). Some of them are also commercially available in a suitable form. Preferably, the radical polymerization method can be used, but ionic polymerization methods can also be used. The molecular weights M of the polymers P1 used according to the invention are generally above 3,000, preferably in a range of 5,000–1,000,000, especially preferably in a range of 20,000–500,000 (determination by light scattering). It should be emphasized, however, that the molecular weights do not appear to have any critical influence on the suitability as a component in the compatible polymer mixtures PM. This is true both for the homopolymers and the copolymers of types P1 and P2. For good compatibility of polymer P1 and polymer P2, the tacticity of the polymers has a certain significance. As a rule, a polymer P2 with a low proportion of isotactic triads (such as one obtained by radical polymerization, for example) is preferred over polymers with a high isotactic proportion, such as one produced by specific ionic polymerization.

The production of the homopolymers and/or copolymers P2 is generally carried out by radical polymerization. (See H. Rauch-Puntigam, Th. Volker, Acryl- und Methacrylverbindungen, Springer-Verlag 1967). Even though production by anionic polymerization or group-transfer polymerization is possible in principle (see also O. W. Webster et al., J. Am. Chem. Soc. 105, 5706 (1983)), the preferred form of production is radical polymerization.

The molecular weights M of the polymers P2 are generally above 3,000, in a general range of 10,000 to 1,000,000, preferably 20,000 to 300,000. For the selection of the monomer components which are to be used as comonomers for P2, care should be taken that the glass temperature Tg of the resulting polymer does not have a restrictive influence on the technical applicability of the total system PM.

For the production of molded elements made from the polymer mixture PM, for example, at least one of the polymers P1 and P2 should demonstrate a glass temperature Tg>70° C. It is preferred for this application that the polymer mixture PM has a glass temperature Tg>70° C. This restriction applies preferably for the production of injection-molded, pressed or extruded objects made of the polymer mixture PM. For other areas of application, for example for varnishes, for elastomers or for reversible thermotropic glazing (polymer mixture with clouding point when heated), in other words for an application in accordance with DE-A 34 36 477.3, however, those polymer mixtures PM are preferred which have a polymer component P2 with a glass temperature Tg<40° C. or preferably <20° C.

PRODUCTION OF THE MIXTURES PM

The compatible mixtures PM can be produced by various methods. For example, they are produced by intensive mechanical mixing of the components P1 and P2 in the melt, in the extruder, etc.; or they can be produced out of a common solvent, as so-called "solution cast polyblends" (see Kirk-Othmer, "Encyclopedia of Chemical Technology", 3rd edition, Vol. 18, p. 443–478, J. Wiley, 1982). The method of procedure can also be that polymers P1 are dissolved in the monomer mixture of the other polymer P2 and subsequently produced in the presence of the polymer P2. Likewise, the polymer mixture PM can be produced out of common precipitants. There are no restrictions on the type of mixing. A very good summary of the production of compatible polymer mixtures is given by M. T. Shaw, pages 57–67, "Polymer Blends and Mixture", noted above. Generally, mixtures of components P1 and P2 are produced first, with the starting materials most advantageously being solids, for example in the form of a bead polymer or a granulate, using slowly operating mixing systems such as drum, Rohn wheel, double chamber-plowshare mixers, or similar equipment. The slowly operating mixing systems cause mechanical mixing without eliminating the phase borders. (See Ullmann's Encyclopadie der Technischen Chemie, 4th edition, Volume 2, p. 282-311, Verlag Chemie.) Subsequently, thermoplastic treatment takes place, by homogeneous mixing in the melt, using mixing systems which can be heated at the temperatures suited for this, e.g. 150° to approximately 300° C., in kneaders or preferably extruders, e.g. single-screw or multiple-screw extruders, or, if necessary, in extruders with an oscillating screw and shear pins (e.g. in the BUSSCO kneader). Using this method, uniform grain granulates (e.g. hot deposit, cube shape, round grain) can be produced. The grain size of the granulates is in a range from 2 to 5 mm. A further simple method for producing polymer mixtures PM is mixing polymer dispersions which contain the polymer component P1 and polymer dispersions which contain the polymer component B. These dispersion mixtures can be coagulated together, spray-dried together or squeezed off together on an extruder.

ADVANTAGEOUS EFFECTS OF THE MIXTURES PM

The compatible polymer mixtures PM according to the invention especially demonstrate the following advantages, which imply the corresponding technical application possibilities with P1 and P2 each being listed to represent the possibilities in the category of polymers P1 and P2, respectively.

1. First, the polymer mixtures—in contrast to mixtures of other polymers P1 which contain carbonyl groups and other polystyrenes—are compatible. That is, the polymer mixtures PM according to the invention are clear as glass in the non-pigmented state, in contrast to non-compatible polymer mixtures (they demonstrate no light scattering, i.e. as a rule, the haze is <10%). However, those mixtures which are only compatible at room temperature, but demonstrate demixing when the temperature is increased, are also in accordance with the invention.

2. Mixtures of P1 and P2, like polystyrene itself, demonstrate a low degree of water absorption.

3. Double refraction of the polymers P1 can be reduced by mixing with P2. The two aforementioned properties qualify the polymer mixtures PM for use especially as data storage material, particularly for information carriers which can be read optically. See J. Hennig, Kunststoffe 75, p. 425 (1985).

4. The refractive index of the polymer P1 can also be reduced, as a rule, by mixing with P2. For example, the refractive index of P1 can be changed in such a way by mixing with P2 that the index of refraction of the polymer mixture PM can be adapted to the index of refraction of an embedded rubber phase. In this way, transparent, impact-resistant plastics can be obtained.

Polymer compositions which contain up to approximately 40-99% by weight, preferably 70-95% by weight of the polymer mixture PM and 60-1% by weight, preferably 30-5% by weight of an additional polymer P3, different from P1 and P2, are also particularly interesting; in these cases, it holds true that polymer P3 is incompatible with polymer P1, P2 and with the mixture PM. As a rule, the composition of the polymer mixture PM is selected in such a way, in this case, that the index of refraction of polymer P3 agrees with the index of refraction of the mixture PM, generally, therefore, the following should apply at room temperature:

$$|n_D{}^{25}{}_{PM} - n_D{}^{25}{}_{P3}| < 0.01$$

As a rule, the polymer P3, which is incompatible with PM, will have a Tg<20° C. and will be convalently bonded with at least one of the components of the polymer mixture PM, in other words with P1 or P2, at least partially. In addition, the polymer P3 can be cross-linked. The case that the polymer P3 is polybutadiene or polyisoprene is very especially preferred.

Polymer compositions composed of 40-99% by weight PM and 1-60% by weight P3 are characterized by an improved impact resistance as compared with pure PM, particularly if P3 demonstrates a Tg<20° C.

In particular, polymer compositions of 40-99% by weight PM and 60-1% by weight P3 allow a simple impact resistant mixture of polymers P2.

5. By sheathing P1 with P2, the production of an optical gradient fiber is possible, for example with the following configuration:

Core: P1, mantle: P2, transition: continuous

As a rule, $n_D{}^{20}P_1 > n_D{}^{20}P_2$. Such fibers can be used as light conducting cables, for example.

6. Objects made of P1 with a thin mantle of P2, particularly of P2 with a UV absorber (polymerized into it as disclosed in U.S. Pat. No. 4,576,870), are also possible. In contrast to unsheathed P1, such objects are resistant to weathering. The problem of re-use of heterogeneously coated plastic wastes, which is a serious problem otherwise, is eliminated, since wastes can be worked in again, because of the good compatibility. As a rule, the objects made of P1 or of the polymer mixture PM are produced by injection, pressing, extrusion, rolling or casting. The mantle of polymer P2 is generally applied by varnishing or by co-extrusion.

7. Plates of P1 with a coating of P2 can be produced. Plates with such a structure have a light permeability which is up to 2% improved as compared with plates of P1. As a rule, plates with a coating of P2 also demonstrate greater scratch resistance and a changed corrosion resistance. Multiple skin sheets such as those used for glazing greenhouses, which have been produced from P1 or a polymer mixture PM and have a coating of P2, are particularly interesting.

Furthermore, cementation of molded elements of P1 with the polymer P2 or, advantageously, with monomers/initiator mixtures which contain monomers II can be carried out. Here, the high polymerization velocity of the monomers II (particularly in the case where $R_3$ is H) can be combined with the good polymer compatibility.

8. Advantages with regard to processing technology result when using mixtures PM of >90% by weight P1 and <10% by weight P2. In this case, the P2 takes over the functions of a processing auxiliary agent. This is particularly interesting for polymers P1 where $R_1$ is methyl.

9. From the polymer mixtures PM according to the invention, transparent molded elements can be obtained, which have been modified at the surface by the action of energy, e.g. suitable radiation, in such a way that the polymer P1, where $R_1$ is $CH_3$, has been degraded but the polymer P2, where $R_3$ is hydrogen, has not. For example, molded elements with a reflection-reducing surface and resists. In the same way, reflection-reducing molded elements can be produced by the fact that $R_1$ is H and $R_3$ is $CH_3$. In this case, the polymer P2 can be degraded by the effect of energy.

10. The polymer mixtures PM according to the invention which demonstrate only limited compatibility find particular interest. Such compatible polymer mixtures which gain the capacity to scatter light when they are heated above the LCST can be advantageously used according to German Pat. No. 34 36 476.5 for the presentation of information which can be read optically, or according to German Pat. No. 34 36 477.3 for the construction of glazing systems with temperature-controlled transparency. The difference in the refractive index of polymer P1 and polymer P2, which is generally quite high, and the great light scattering which occurs in the case of de-mixing, as well as the broad possibility of variation in the values $R_1$, $R_2$, $R_3$, $R_5$, $R_6$ and X make the polymer mixtures PM according to the invention particularly suitable for this area of application. (See also the example poly-p-ter.-butyl styrene/polycyclohexyl acrylate.)

The following examples are intended to explain the invention, without limiting it. In particular, the large range of compatibility of the polymers P1 with the polymers P2 which contain carbonyl groups will be shown, particularly using the example of poly-p-tert-butyl styrene, which can be viewed as a typical representative of the polymer species P1 (distinct aliphatic group directly next to the phenyl group), as polymer P1 (polymer P1 with $R_1$ is H and $R_2$ is tertbutyl).

On the other hand, using the example of poly-p-methyl styrene, which represents the limit of the range of validity of this invention as polymer P1 where $R_2$ is methyl (polystyrene: $R_3$ is hydrogen is not included in the present invention!), the limit of the invention will also be shown. It should be specifically pointed out once again that specifically the borderline of compatibility (see Point 10 above) can be particular interest from the point of view of application technology.

Determination of the reduced viscosity ($\eta_{spec/c}$) is based on DIN 1342, DIN 51562 and DIN 7745. Determination of the light permeability can be carried out according to DIN 5036, unless otherwise specified. The cloudiness (haze) is indicated in % (ASTM D 1003). The measurements are generally carried out on a plate with a thickness of 3 mm. The ratios indicated refer to weight ratios.

Other features of the invention will become apparent in the course of the following descriptions of exemplary embodiments which are given for illustration of the invention and are not intended to be limiting thereof.

EXAMPLES

Example 1

Compatible polymer mixtures PM of poly-p-tert.-butyl styrene (polymer P1) and poly-3,3,5-trimethylcyclohexyl acrylate (polymer P2). Poly-p-tert-butyl styrene (source: Aldrich, Germany; $\eta_{spec/c}=16$ ml/g) is dissolved in toluene at 20% by weight. In the same way a 20% solution of poly-3,3,5-trimethylcyclohexyl acrylate ($\eta_{spec/c}=6.9$ ml/g) in toluene is produced. The solutions are mixed in the volume ratios of 20/80, 50/50, 80/20. Films are poured of these solutions, dried in a vacuum and subsequently evaluated visually. All mixtures result in clear, colorless films.

All three films demonstrate no de-mixing when heated to decomposition (>250° C.).

Example 2

Poly-p-tert.-butyl styrene according to Example 1 is mixed with poly-3,3,5-trimethylcyclohexyl methacrylate (polymer P2) ($\eta_{spec/c}=6.3$ ml/g) as described in Example 1. At every mixture ratio (20/80, 50/50, 80/20) compatible polymer films, clear as glass, result; they demonstrate no de-mixing when heated to temperatures of approximately 250° C.

Example 3

Poly-p-tert.-butyl styrene according to Example 1 is mixed with polycyclohexyl methacrylate ($\eta_{spec/c}=29$ ml/g) as described in Example 1, as a 20% solution in toluene, and a polymer film is produced.

Mixture ratio:
  50% by weight poly-p-tert.-butyl styrene
  50% by weight polycyclohexyl methacrylate A polymer film, clear as glass, is obtained; it becomes cloudy when heated to 160° C. (de-mixing).

Example 4

The process is the same as in Example 3, but polycyclohexyl acrylate is selected as polymer P2. A polymer film, clear as glass, results; it becomes cloudy when heated to 80° C. Polymer mixtures according to Example 3 and Example 4 are therefore very well suited for use as an optical data storage plate according to German Pat. No. 34 36 476.5.

Example 5

Production of a plastic plate with temperature-controlled transparency. 20 parts poly-p-tert.-butyl styrene according to Example 1 are dissolved in 80 parts cyclohexyl acrylate. 0.1 part tert. butyl perneodecanoate is added as an initiator and 0.5 parts dodecyl mercaptan is added as a regulator. The polymer solution is polymerized to form a clear, colorless plate with a thickness of 3 mm between two glass plates. When heated to approximately 80° C., this plate becomes snow-white.

Example 6 - Comparative Example

The process is the same as in Example 5, but the poly-p-tert.-butyl styrene is dissolved in 80 parts MMA and the polymerization is carried out. A non-homogeneous, non-compatible, non-transparent plastic plate results.

Example 7 - Comparative Example

The process is the same as in Example 5, but the poly-p-tert-butyl styrene is dissolved in 80 parts t-butyl methacrylate. Here again, after polymerization, a non-transparent, non-compatible polymer mixture results.

Example 8 - Polymer P2 as a Copolymer

The process is the same as in Example 5, but the poly-p-tert-butyl styrene (20 parts) is dissolved in a mixture of 40 parts propyl methacrylate and 40 parts cyclohexyl methacrylate. After completion of polymerization, a homogeneous plate, clear as glass, is obtained.

Example 9

The process is the same as in Example 5, but the 20 parts poly-p-tert.-butyl styrene are dissolved in 80 parts 2-ethylhexyl methacrylate. After the end of polymerization, a compatible plastic plate, clear as glass is obtained.

Example 10

Poly-p-tert-butyl styrene according to Example 1 is dissolved in toluene at 20% by weight. In the same way, poly-2-ethylhexyl acrylate is dissolved in toluene at 20% by weight.

The solutions are mixed in a ratio of 20/80, 50/50, 80/20. Films are poured from the mixtures. The films are dried in a vacuum and subsequently evaluated visually. In each case clear, colorless films result.

Example 11

Poly-p-methyl styrene ($\eta_{spec/c}$=4 ml/g) is dissolved in toluene at 20% by weight. In the same way, polycyclohexyl methacrylate ($\eta_{spec/c}$=29 ml/g) is dissolved in toluene at 20% by weight. The solutions are mixed in a ratio of 5/95, 20/80, 50/50, 80/20 95/5. Films are poured from the mixtures and dried. All the mixtures yield clear, colorless films.

All the films demonstrate no de-mixing when heated up to 250° C.

Example 12

20 parts poly-p-methyl styrene ($\eta_{spec/c}$=83 ml/g) are dissolved in 80 parts cyclohexyl acrylate. After adding 0.1 part tert. butyl perneodecanoate and 0.5 parts dodecyl mercaptan, polymerization is carried out for 48 hours at approximately 50° C. The polymerization is carried out between glass plates. A colorless plastic plate, clear as glass, with a thickness of 3 mm is obtained (haze<3%), which also remains clear when heated to >200° C.

Example 13

20 parts poly-p-methyl styrene ($\eta_{spec/c}$=83 ml/g) are dissolved in 60 parts cyclohexyl acrylate and 20 parts 3,3,5-trimethylcyclohexyl acrylate and polymerized according to Example 12 after adding 0.1 part tert. butyl perneodecanoate and 0.5 parts dodecyl mercaptan. A compatible plastic plate, clear as glass, is obtained.

Example 14 - Copolymer Example 20 parts poly-p-methyl styrene ($\eta_{spec/c}$=83 ml/g) are dissolved in 60 parts cyclohexyl acrylate and 20 parts butyl acrylate, and polymerized according to Example 12 after adding 0.1 part tert. butyl perneodecanoate and 0.5 parts dodecyl mercaptan. A compatible plastic plate, clear as glass, is obtained.

Example 15

Comparative example with a relationship of the Van der Waals volumes VW of

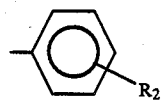

and X—CHR$_5$R$_6$ not in accordance with the invention.

20 parts poly-p-methyl styrene ($\eta_{spec/c}$=83 ml/g) are dissolved in 80 parts decyl methacrylate and polymerized according to Example 12. A de-mixed, cloudy plastic plate results.

Calculation of the Van der Waals volumes:

Polymer P1: 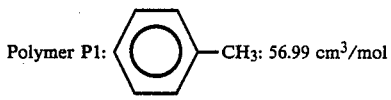 CH$_3$: 56.99 cm$^3$/mol

Polymer P2: —C—O—(CH$_2$)$_9$—CH$_3$: 120.94 cm$^3$/mol
             ‖
             O Therefore, according to relation (1), $V_W$—COO—(CH$_2$)$_9$ CH$_3$ $\times$ 0.6 = 72.5 cm$^3$/mol, greater than $V_W$ 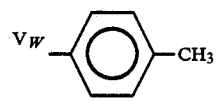 CH$_3$ ($V_W \times$ 56.99 cm$^3$/mol) and therefore not in accordance with the invention.

Example 16

Comparative example with several characteristics not in accordance with the invention:
(1) Disadvantageous ratio of the Van der Waals volumes
(2) Polymer P1 with only slightly distinct aliphatic part without quarternary carbon, polymer P2 with large compact hydrocarbon group with one quarternary carbon.

20 parts poly-p-methyl styrene ($\eta_{spec/c}$=83 ml/g) are dissolved in 80 parts 3,3,5-trimethylcyclohexyl methacrylate and polymerized according to Example 12. A de-mixed, cloudy plastic plate results. Van der Waals volumes:

Polymer P1: 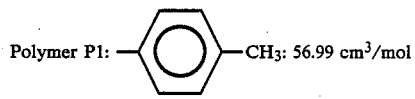 CH$_3$: 56.99 cm$^3$/mol

Polymer P2: —C—O— 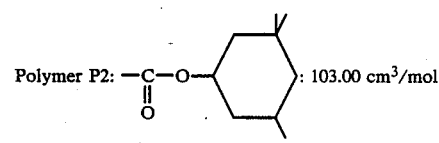 : 103.00 cm$^3$/mol
             ‖
             O $V_W$—COO— 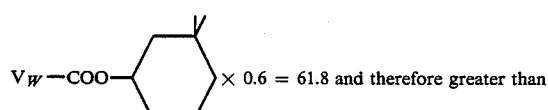 $\times$ 0.6 = 61.8 and therefore greater than $V_W$  CH$^3$.

According to (1), this mixture is not in accordance with the invention.

Example 17

From 20 parts poly-p-tert. butyl styrene according to Example 1 and 80 parts isobornyl methacrylate, a solution is produced in toluene, and dried to form a film as in Example 1. A colorless film, clear as glass, results.

Example 18

20 parts poly-p-tert. butyl styrene according to Example 1 are dissolved in 80 parts benzyl acrylate and polymerized according to Example 12. A colorless plate, clear as glass, results.

Example 19

20 parts poly-p-tert. butyl styrene according to Example 1 are dissolved in 80 parts 2-phenyl ethyl acrylate and polymerized according to Example 12. A colorless plate, clear as glass, results.

Example 20

A sheet of poly-p-methylstyrene (J=83 ml/g) 3 mm thick is coated with a 20% b.w. solution of a polymer P2 dissolved in a solvent mixture consisting of
- 40% b.w. of diacetone alcohol
- 40% b.w. of isopropanol
- 20% b.w. of methyl ethylketone.

The coated sheet is dried at 90° C.

The polymer P2 is characterized as follows: Copolymer, produced by radical polymerization of 49% b.w. of methyl methacrylate, 2% b.w. of cyclohexyacrylate (J=32 ml/g).

The result is a perfectly clear sheet with a well adhering surface coating.

Example 21

The surface of 1 mm sheet of poly-p-methylstyrene (J=83 ml/g) is covered with 10 μm coating of polycyclohexymethyacrylate. (J=31 ml/g). The sheet thus obtained is ground and subsequently granulated and the granulate is again extruded to form a 1 mm sheet. In this way the working up of waste material is simulated. The sheets obtained in this fashion are perfectly clear and not inferior to the original poly-p-methylstyrene sheet.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A compatible polymer mixture of two different polymer components, comprising:
   a miscible polymer mixture of
   (A) 0.1–99.9% by weight of a polymer P1, which comprises at least 30% by weight of monomers with Formula I,

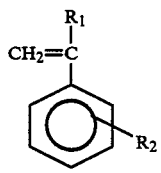

wherein $R_1$ is hydrogen or methyl and $R_2$ is a hydrocarbon group with 1–18 carbon atoms, and wherein said polymer P1 contains less than 20 wt. % styrene or α-methyl styrene, and (B) 99–0.1% by weight of a polymer P2 which comprises at least 30% by weight of a monomer with Formula II

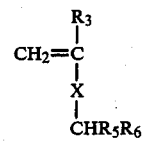

wherein $R_3$ is hydrogen, methyl or a group $-CH_2-X-CHR_5R_6$, X is

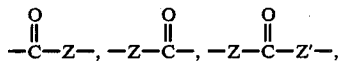

wherein Z is oxygen or $-NR_4$, Z' is oxygen or $-NR_4$, and $R_4$ is hydrogen or an alkyl group with 1–12 carbon atoms, $-CHR_5R_6$ is an aliphatic or araliphatic hydrocarbon group with 5–24 carbon atoms.

2. The compatible polymer mixture of claim 1, wherein the following Van der Waals volume relationship is satisfied:

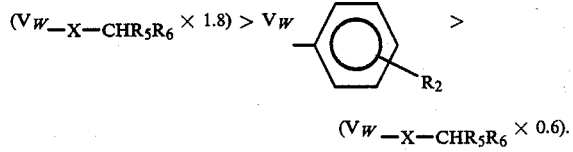

3. The compatible polymer mixture of claim 1 wherein the heat of mixing of the hydrogenated monomers H1 and H2 of said polymer P1 and polymer P2 satisfies the condition:

ΔH mixture (H1/H2)<50 cal/mol of said mixture.

4. The compatible polymer mixture of claim 1, wherein $R_5$ and $R_6$ are combined in a ring comprising 5–12 carbon atoms.

5. The compatible polymer mixture of claim 1, wherein $R_5$ is hydrogen or a hydrocarbon group with 1–5 carbon atoms and $R_6$ is an aliphatic, araliphatic or aromatic hydrocarbon group with 4–18 carbon atoms.

6. The compatible polymer mixture of claim 1, wherein the group —X— is

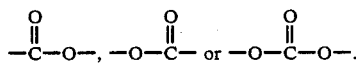

7. The compatible polymer mixture of claim 1, wherein $R_3$ is hydrogen or methyl.

8. The compatible polymer mixture of claim 1, wherein $R_5$ and $R_6$ are combined in a cyclohexane ring.

9. The compatible polymer mixture of claim 1, wherein $R_6$ is a branched aliphatic group with 4–18 carbon atoms.

10. The compatible polymer mixture of claim 1, wherein $R_2$ is $-CCH_3R_7R_8$, where $R_7$ is hydrogen or an alkyl group with 1–8 carbon atoms and $R_8$ is an alkyl group with 1–8 carbon atoms.

11. The compatible polymer mixture of claim 1, wherein $R_2$ is t-butyl.

12. The compatible polymer mixture of claim 1, wherein $R_1$ is hydrogen.

13. The compatible polymer mixture of claim 1, wherein $R_1$ is hydrogen and $R_2$ is t-butyl.

14. The compatible polymer mixture of claim 1, wherein said polymer P1 is a poly-t-butyl styrene and the polymer P2 is a polycyclohexyl (meth)acrylate, optionally substituted with alkyl groups comprising 1–6 carbon atoms.

15. The compatible polymer mixture of claim 14, wherein said polymer P2 is poly-3,3,5-trimethylcyclohexyl acrylate, poly-3,3,5-trimethylcyclohexyl methacrylate or mixtures thereof.

16. The compatible polymer mixture of claim 1, wherein said polymer P1 is a poly-t-butyl styrene and said polymer P2 is a poly-2-ethylhexyl acrylate, poly-2-ethylhexyl methacrylate or mixtures thereof.

17. The compatible polymer mixture of claim 1, wherein said polymer P1 is a poly-t-butyl styrene and said polymer P2 is a poly-3,3-dimethylpropyl methacrylate.

18. The compatible polymer mixture of claim 1, wherein said polymer P1 is a poly-t-alkyl styrene and said polymer P2 is a poly-ω-phenylalkyl acrylate with an alkyl chain comprising 1–3 carbon atoms.

19. The compatible polymer mixture of claim 18, wherein said polymer P1 is a poly-t-butyl styrene and said polymer P2 is a poly-2-ethylphenyl acrylate, polybenzyl acrylate or mixtures thereof.

20. The compatible polymer mixture of claim 1, wherein said polymer P1 is a poly-p-methyl styrene and said polymer P2 is a polycyclohexyl (meth)acrylate.

21. The compatible polymer mixture of claim 1, wherein said polymer mixture demonstrates a clouding point when heated.

22. The compatible polymer mixture of claim 1, wherein said polymer mixture demonstrates a haze<10% as measured on a plate with a thickness of 3 mm.

23. The compatible polymer mixture of claim 1, wherein said monomer with Formula II is selected from the group consisting of vinyl or propenyl esters of cycloalkane carboxylic acids and cycloalkyl carbonates, cycloalkyl acrylates, cycloalkyl methacrylates, cycloalkyl itaconates, vinyl esters or propenyl esters of phenylalkyl carboxylic acids and phenylalkyl carbonates, phenylalkyl methacrylates and phenylalkyl itaconates.

* * * * *